US010533354B2

(12) United States Patent
Phillips

(10) Patent No.: US 10,533,354 B2
(45) Date of Patent: Jan. 14, 2020

(54) HANDLE ASSEMBLY

(71) Applicant: SKYLOCK INDUSTRIES, Azusa, CA (US)

(72) Inventor: Braskel E. Phillips, Covina, CA (US)

(73) Assignee: Skylock Industries, Azusa, CA (US)

( * ) Notice: Subject to any disclaimer, the term of this patent is extended or adjusted under 35 U.S.C. 154(b) by 365 days.

(21) Appl. No.: 15/299,379

(22) Filed: Oct. 20, 2016

(65) Prior Publication Data

US 2018/0112445 A1 Apr. 26, 2018

(51) Int. Cl.
E05B 5/02 (2006.01)
E05B 85/10 (2014.01)
B64C 1/14 (2006.01)

(52) U.S. Cl.
CPC .......... E05B 85/107 (2013.01); B64C 1/1415 (2013.01); E05B 85/103 (2013.01); Y10S 292/31 (2013.01)

(58) Field of Classification Search
CPC .... Y10S 292/31; Y10S 292/56; Y10S 292/73; E05B 85/103; E05B 85/107
USPC ........................ 292/336.3; 285/330, 913, 914
See application file for complete search history.

(56) References Cited

U.S. PATENT DOCUMENTS

| 392,133 | A | * | 10/1888 | Peck | E05C 19/04 |
| | | | | | 292/73 |
| 1,504,363 | A | * | 8/1924 | Madigan | F16L 19/02 |
| | | | | | 285/148.16 |
| 2,008,096 | A | * | 7/1935 | Clo | B60C 29/00 |
| | | | | | 285/330 |
| 2,077,869 | A | * | 4/1937 | Monzani | F16L 37/113 |
| | | | | | 285/148.13 |
| 2,218,960 | A | * | 10/1940 | Rightmyer | E05B 5/003 |
| | | | | | 292/1 |
| 2,246,708 | A | * | 6/1941 | Wieben | E05B 85/10 |
| | | | | | 292/1 |
| 2,255,402 | A | * | 9/1941 | Vile | E05B 63/0013 |
| | | | | | 70/139 |
| 2,486,586 | A | * | 11/1949 | Brittain | E05B 5/003 |
| | | | | | 292/1 |
| 2,500,720 | A | * | 3/1950 | Van Der Heem | A47L 9/242 |
| | | | | | 285/328 |

(Continued)

FOREIGN PATENT DOCUMENTS

GB 683 445 A 11/1952

OTHER PUBLICATIONS

Partial European Search Report issued in parallel European Application No. EP 17 19 7363, dated Mar. 1, 2018, 11 pages.

(Continued)

Primary Examiner — Carlos Lugo
(74) Attorney, Agent, or Firm — Lewis Roca Rothgerber Christie LLP

(57) ABSTRACT

A flush-mounted handle assembly for a cargo door having an exterior rotatable handle having a bumper assembly and an interior rotatable handle, a housing having a cavity for receipt of the exterior rotatable handle and an actuator positioned between the interior rotatable handle and housing. The housing having a skid plate positioned within the cavity for receipt of the bumper when the exterior rotatable handle is rotated and the housing also having a shaft removably connected to the housing by a nut for receipt of the actuator.

9 Claims, 3 Drawing Sheets

(56) References Cited

U.S. PATENT DOCUMENTS

| | | | | |
|---|---|---|---|---|
| 2,570,160 A * | 10/1951 | Schoch | ................ | E05B 5/003 |
| | | | | 292/1 |
| 2,833,582 A | 5/1958 | Henrichs | | |
| 3,133,757 A * | 5/1964 | James | .................... | E05C 19/04 |
| | | | | 292/337 |
| 3,953,061 A * | 4/1976 | Hansen | .................. | E05C 9/002 |
| | | | | 292/5 |
| 4,480,451 A * | 11/1984 | Fujiya | ................ | E05B 65/0053 |
| | | | | 292/21 |
| 4,487,440 A | 12/1984 | Beijer | | |
| 4,510,779 A * | 4/1985 | Ahad | ...................... | E05B 5/00 |
| | | | | 292/DIG. 31 |
| 4,604,879 A * | 8/1986 | Neary | .................. | E05B 55/005 |
| | | | | 292/348 |
| 4,898,408 A * | 2/1990 | Hauber | ............... | E05B 63/0069 |
| | | | | 292/21 |
| 4,921,289 A * | 5/1990 | Shen | ..................... | E05B 55/005 |
| | | | | 292/336.3 |
| 4,986,576 A * | 1/1991 | Anderson | ............... | E05B 35/08 |
| | | | | 292/40 |
| 5,156,359 A | 10/1992 | Noble et al. | | |
| 5,787,743 A * | 8/1998 | Weigard | .............. | E05B 17/0058 |
| | | | | 292/336.3 |
| 5,862,570 A * | 1/1999 | Lezuch | ................ | E05C 17/085 |
| | | | | 16/82 |
| 6,059,231 A * | 5/2000 | Dessenberger, Jr. | ........................ | |
| | | | | B64C 1/1407 |
| | | | | 244/129.5 |
| 6,082,333 A * | 7/2000 | Vattelana | ........... | F02M 37/0017 |
| | | | | 123/456 |
| 6,095,573 A * | 8/2000 | Rozema | ................. | E05B 5/003 |
| | | | | 292/336.3 |
| 6,234,041 B1 * | 5/2001 | Larabet | ................... | E05B 85/16 |
| | | | | 74/523 |
| 6,428,060 B1 * | 8/2002 | Metz | ....................... | E05C 3/042 |
| | | | | 292/227 |
| 6,640,592 B2 * | 11/2003 | Vickers | ................... | E05B 17/04 |
| | | | | 292/64 |
| 6,668,689 B1 * | 12/2003 | Lai | ...................... | B25B 13/5091 |
| | | | | 335/284 |
| 7,143,473 B2 * | 12/2006 | Matsuki | ................ | E05C 17/206 |
| | | | | 16/86 C |
| 7,441,427 B2 * | 10/2008 | Vickers | ............... | E05B 17/0025 |
| | | | | 70/127 |
| 7,571,941 B2 * | 8/2009 | Chang | ....................... | E05B 9/08 |
| | | | | 292/347 |
| 7,866,714 B2 * | 1/2011 | Monig | .................... | E05B 81/76 |
| | | | | 292/336.3 |
| 8,070,194 B2 * | 12/2011 | Houis | ....................... | E05B 3/00 |
| | | | | 16/412 |
| 9,228,387 B2 * | 1/2016 | Header | ..................... | E05F 5/02 |
| 2003/0213095 A1 | 11/2003 | Jackson | | |
| 2015/0337570 A1 | 11/2015 | Powell et al. | | |
| 2016/0060916 A1 | 3/2016 | Hernandez | | |

OTHER PUBLICATIONS

Hartwell Corporation Component Maintenance Manual, Part No. H514, Document No. 52-36-15, Apr. 15, 2012, 82 pages.

Boeing 737-600/700/800/900 Parts Catalog (Maintenance), Latch and Torque Tube Assy Fwd and Aft Cargo Doors, Document No. 52-31-51-02, Oct. 15, 2009 and Oct. 15, 2012.

Extended European Search Report issued in corresponding European Appln. No. 17197363.9-1005, dated Aug. 9, 2018, 11 pages.

* cited by examiner

HANDLE ASSEMBLY

FIELD OF THE INVENTION

This invention relates to a handle assembly, and more particularly to a cargo door handle assembly that is externally flush-mounted consisting of a housing, inside handle, actuator and an outside handle subassembly.

BACKGROUND OF THE INVENTION

Handle assemblies for cargo doors on airplanes for aerodynamic reasons must be flush-mounted to the door and must be operable from both outside the door and inside of the door. Consequently such prior handle assemblies include an external flush-mounted handle mechanism used to drive a door locking system to secure the hinged cargo door to the door frame of the airplane. The handle assembly includes a housing, an inside handle, an actuator, a rod assembly and an outside handle subassembly. Both the outside and inside handles are attached to the actuator with the outside handle being spring loaded in a down retracted position inside the housing. A spring loaded hinged door assembly attached to the housing provides access to the retracted and flush outside handle.

To operate the handle assembly between an open and a closed retracted position, the handle includes a bumper that rides on a ramp inside of the housing. Since the handle is spring actuated, the handle spring retracts the handle forcing the handle down the ramp rotating the handle and aligning it within the housing to the stowed position. This action of the bumper riding on the ramp within the housing after repeated use causes failure of either the bumper, the housing or both through repeated use. These failures require replacement of the handle assembly or the housing assembly which is an expensive and time consuming proposition. In addition because the housing is a one piece design the entire housing needs to be replaced upon failure which adds to the expense and maintenance of the handle assembly. Consequently a need existence for an improved handle assembly construction which addresses the drawbacks of prior handle assembly designs which can be repaired and maintained easily and inexpensively.

SUMMARY OF THE INVENTION

The present invention is directed to a handle assembly which addresses the drawbacks of the prior handle assemblies and is easy to prepare and maintain thereby preventing unnecessary replacement. The handle assembly is an external flush-mounted T-handle mechanism used to drive a door locking system that secures a hinged access door, namely an airplane cargo door, to a door frame. The handle assembly consists of a housing, inside handle, actuator and an outside handle subassembly. The handle assembly can attach to a rod assembly as necessary. Both the outside and inside handles are attached to the actuator with the outside handle being spring loaded in a down and retracted position inside the housing. A spring loaded hinged door assembly attached to the housing provides access to the retracted and flush outside handle.

To open the handle assembly with the external handle from the closed position, the housing door is pushed down into the housing, where the T-handle can be grabbed and pulled out prior to rotation. The T-handle is rotated counterclockwise rotating the actuator to the open position. To close the external handle, the handle is rotated clockwise aligning the handle with the housing and releasing the handle. This allows the handle spring to retract the handle to the stowed and flush position. The external handle and the housing are aligned prior to the handle being stowed. To assist with this process, the handle has a bumper that rides on a ramp inside the housing. The handle spring retracts the handle forcing the handle down the ramp rotating the handle and aligning it with the housing to the stowed position.

To open the handle assembly with the internal handle from the closed position, the internal handle is turned clockwise to the open position. The inside handle can be rotated to the open or closed position without rotating the external handle from its stowed position. If the handle assembly's external handle is open and in the extended position it can be closed using the internal handle. This is accomplished by rotating the internal handle counterclockwise which will drive the external handle to the closed position allowing the handle spring to retract the handle to the stowed position in the housing.

The ramp inside the housing has a hardened skid plate attached thereto for engagement by the bumper on the handle and prevents the housing from being worn out by the action between the bumper and the ramp. The skid plate, also referred to as wear plate protects the housing and is positioned within a pocket machined into the housing to provide the ramp surface. The bumper on the handle is threadably connected to the handle thereby providing a secure attachment and ease of replacement should the bumper wear out.

The housing of the handle assembly is a three piece design including a shaft, lock ring and housing body. The shaft has four flat surfaces machined around the circumference of the shaft which mate with four flat surfaces in the housing body for engagement and alignment. The shaft is attached to the housing body with the lock ring which is a threaded nut thereby allowing for the shaft to be replaceable during field maintenance should the shaft become damaged. The three piece housing design allows for replacement of the shaft without having to replace the entire housing assembly thereby reducing cost of maintenance.

These and other aspects of the invention will be more fully understood by reference to the following detailed description.

DETAILED DESCRIPTION

Figure 1:
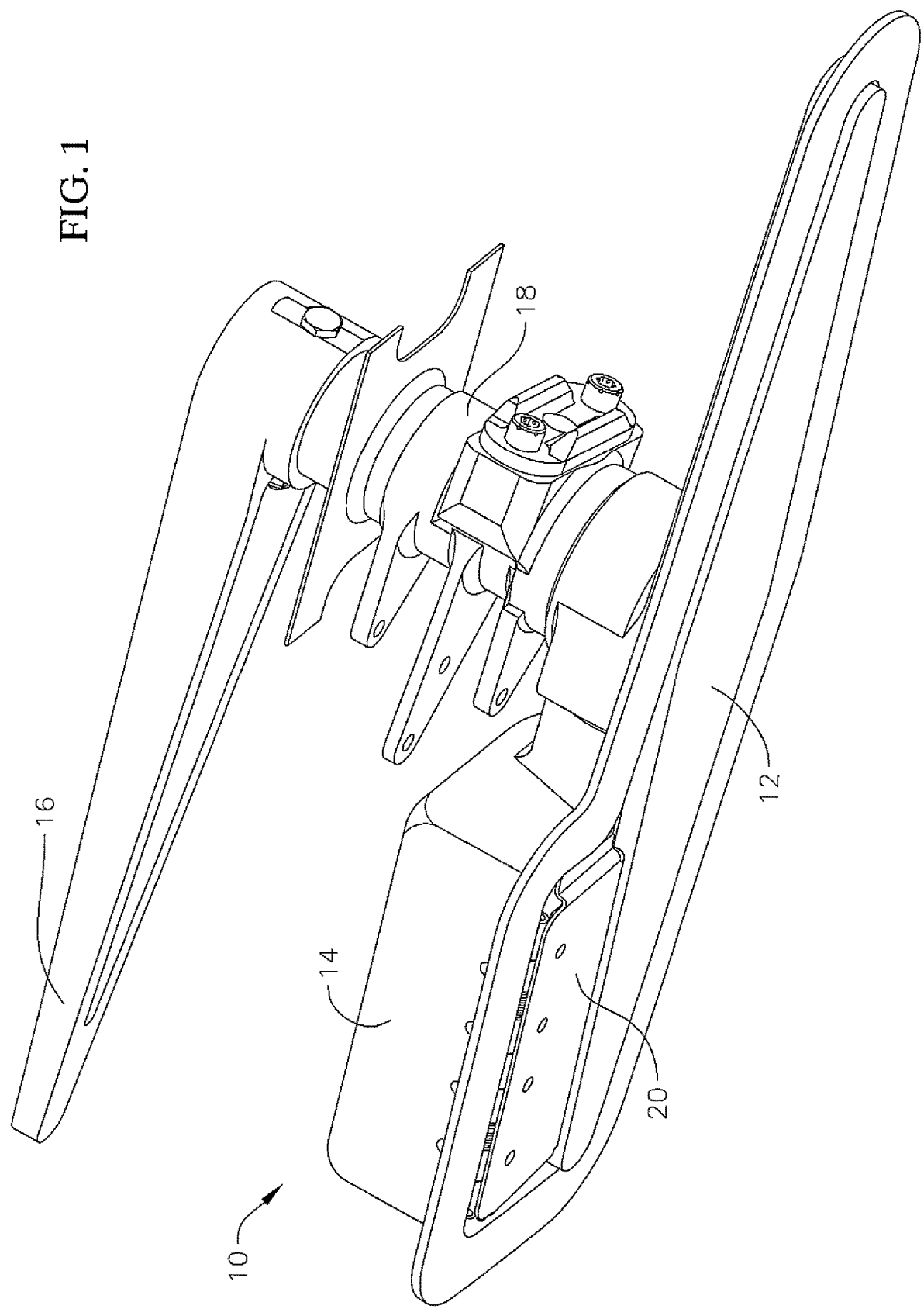
FIG. 1 is a perspective view of the handle's assembly of the present invention.

Referring to FIG. 1, the handle assembly of the present invention is illustrated. The handle assembly 10 is an externally flush-mounted assembly within a door (not shown) such as a cargo door of an airplane, namely a Boeing 737, for example. The concepts of the invention could equally be applicable to other flush-mounted door applications for other types of vehicles. The handle assembly 10 includes an external handle 12 positioned within a housing 14 and an internal handle 16 connected to an actuator 18 attached to the housing 14. A hinged door assembly 20 is positioned in the housing 14 adjacent the external handle 12.

Figure 2:
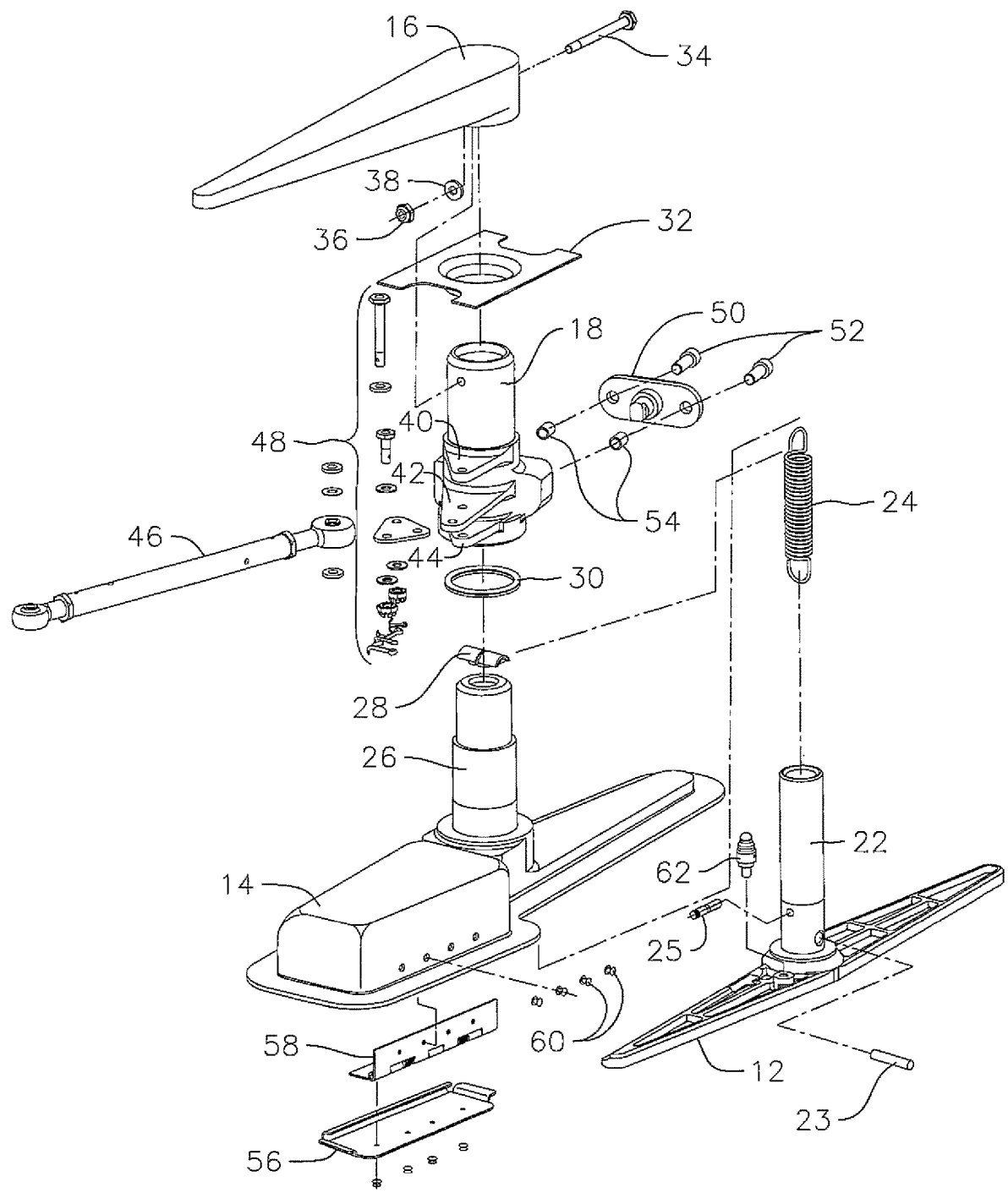
FIG. 2 is an exploded perspective view of the handle assembly of FIG. 1.

Referring to FIG. 2, the external handle 12 is T-shaped and includes a sleeve 22 which is pinned to the handle 12 by a sleeve pin 23. Sleeve 22 houses a spring 24 which is pinned within the sleeve by a spring pin 25 at an end near the handle 12. The external handle is positioned within the housing 14 such that sleeve 22 extends into housing shaft 26. A spring retainer 28 is connected to the opposite end of the spring and is positioned on the outside end of the housing shaft 26.

The actuator 18 is positioned over the housing shaft 26 and a ring seal 30 is positioned between the actuator and the housing shaft 26. A collar 32 is positioned over the opposite end of the actuator and the internal handle 16 is positioned on an opposite end of the actuator and connected thereto by bolt 34, nut 36 and washer 38. Actuator 18 includes a plurality of flanges 40, 42, 44 for the attachment of a rod assembly 46 for applications where a rod assembly is necessary. The rod assembly is attached at an opposite end to other locations on a door. Suitable hardware 48 connects the rod assembly to the flanges. Actuator 18 also includes a fitting 50 attached to the actuator by screws 52 and inserts 54.

Hinged door assembly 20 includes hinge plates 56 and 58 which are hinged together with springs. The hinged door assembly is positioned within a cavity of the housing 14 by rivets 60. The external handle 12 includes a bumper sub-assembly 62 threaded into an inside surface of the handle 12 adjacent the sleeve 22. The bumper sub-assembly is made out of nylon, Torlon and corrosion resistant stainless steel and is threaded so that it can easily be replaced when damaged or worn out.

Figure 3:
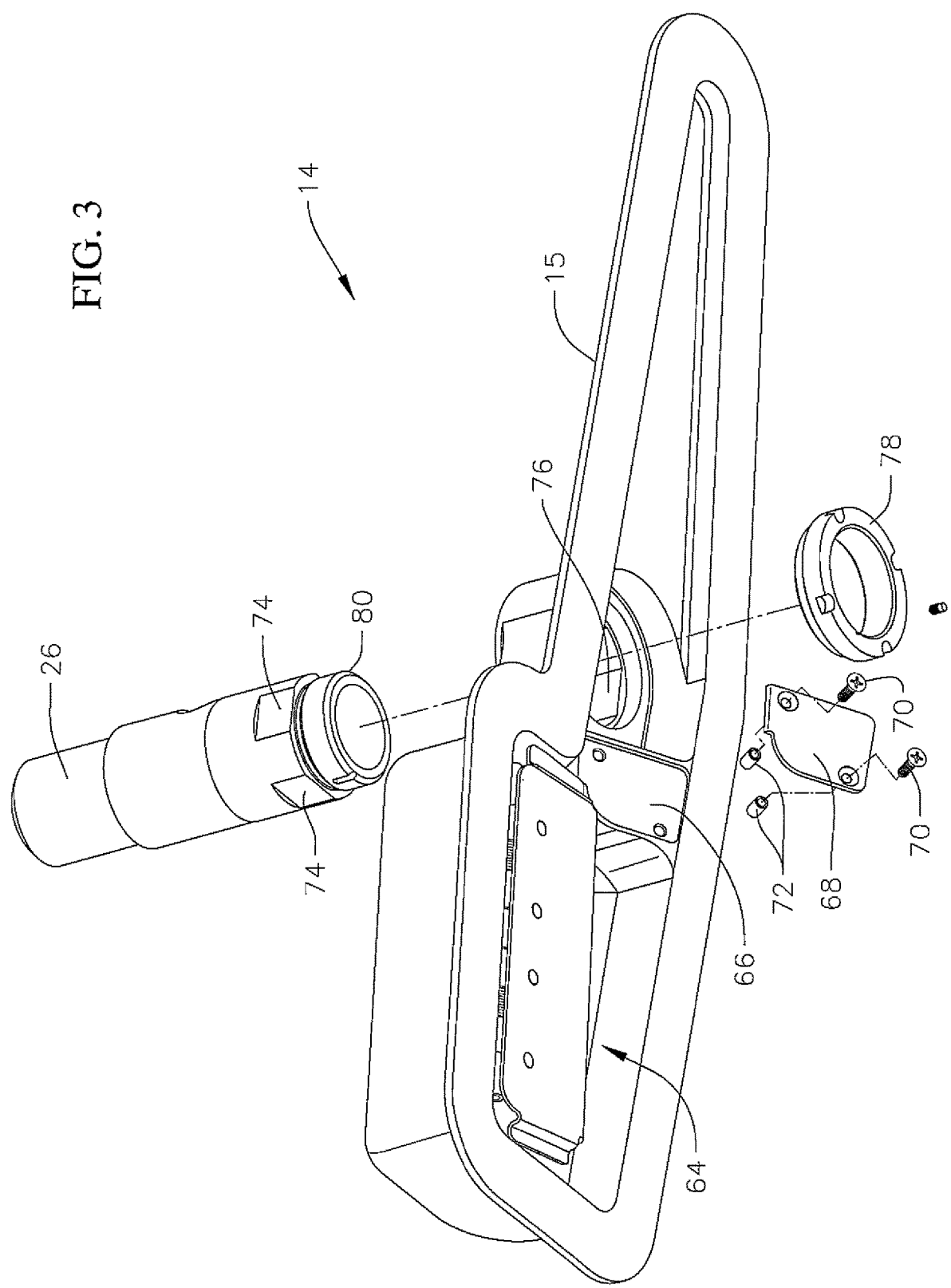
FIG. 3 is an exploded perspective detailed view of the housing of the handle assembly of FIG. 1.

Referring now to FIG. 3, the housing 14 includes an interior recessed portion 64 in the housing body 15 for receipt of the exterior handle assembly and includes an enlarged portion adjacent the hinged door assembly so that the operator can insert their fingers to push the hinge door assembly inwardly and reach into the housing to manipulate the external handle. The recess 64 of the housing body includes an angled ramp portion 66 machined into the housing body providing a recess for the receipt of the hardened skid plate 68. Skid plate 68 is positioned within the recess in the ramp portion by screws 70 and inserts 72. The hardened skid plate provides a surface for the bumper to ride on without damaging the housing body.

The housing 14 further includes the housing shaft 26 which includes four flat surfaces 74 spaced around the circumference of a lower end 80 of the shaft which mate with complimentary flat surfaces 76 within the housing body to align the housing shaft with the housing body. A housing nut 78 is then positioned on the lower end 80 of the housing shaft protruding through the housing body into the recess of the housing body. The housing nut firmly attaches the shaft to the housing body thus making the housing a three piece component. Having a removable housing shaft provides for replacement and repair should housing shaft be damaged without having to replace the housing body.

Both the outside and inside handles are attached to the actuator with the outside handle being spring loaded down in a retracted position inside the housing body. The spring loaded hinged door assembly attached within the housing body recess provides access to the retracted and flush outside handle. To open the handle assembly with the external handle from the closed position, the hinged housing door is pushed down into the housing body and the exterior handle is grabbed and pulled outwardly prior to rotation. The exterior handle is then rotated counterclockwise which rotates the actuator to the open position. To close the external handle, the handle is rotated clockwise aligning the handle with the housing body and releasing the handle. This allows the handle spring to retract the handle to its stowed and flush position. The external handle and housing body are aligned prior to the handle being stowed. To assist this process, the bumper assembly of the handle rides on the skid plate on the ramp portion of the housing body. The handle spring retracts the handle forcing the handle down the ramp portion rotating the handle and aligning with the housing body to the stowed position.

To open the handle assembly with the internal handle from the closed position, the internal handle is turned clockwise to the open position. The inside handle can be rotated to the open or closed position without rotating the external handle from its stowed position. If the handle assembly's external handle is open and in the extended position it can be closed using the internal handle. Rotating the internal handle counterclockwise will drive the external handle to the closed position allowing the handle spring to retract the handle to the stowed position in the housing body.

Although the present invention has been described and illustrated with respect to a specific embodiment thereof, it is to be understood that changes and modifications can be made therein which are within the full intended scope of the invention as herein after claimed.

What is claimed is:

1. A handle assembly comprising:
   an exterior handle having a sleeve extending from an inside surface of the exterior handle for allowing the exterior handle to rotate;
   a bumper assembly threaded into the inside surface of the exterior handle adjacent and extending parallel to the sleeve;
   an interior rotatable handle;
   a housing having a housing body with a cavity for receipt of the interior rotatable handle and a housing shaft; and
   an actuator operatively connected with the interior and exterior handles and being attached to the housing shaft and being positioned between the interior rotatable handle and the housing body;
   wherein the housing body has a hinged door assembly within the cavity adjacent the external rotatable handle, and has an angled ramp portion, located at one side of the housing shaft and the hinged door assembly, having a skid plate positioned within a recess in the angled ramp portion within the cavity for engagement with the bumper assembly when the exterior rotatable handle is rotated.

2. The handle assembly of claim 1 wherein the housing shaft is removably connected to the housing body.

3. The handle assembly of claim 2 wherein the housing shaft has a plurality of flat surfaces positioned on and end of the housing shaft that align with a plurality flat surfaces within the cavity of the housing body.

4. The handle assembly of claim 2 wherein the housing shaft is attached to the housing body by a nut.

5. The handle assembly of claim 1 wherein the sleeve is pinned to the external handle.

6. The handle assembly of claim 1 wherein the sleeve of the external handle extends through the housing body and into the actuator.

7. The handle assembly of claim 6 wherein a spring is positioned within the sleeve to bias the external handle.

8. The handle assembly of claim 7 wherein the spring is pinned within the sleeve by a spring pin at the end near the exterior handle.

9. The handle assembly of claim 1 further comprising a rod assembly connected to the actuator.

\* \* \* \* \*

UNITED STATES PATENT AND TRADEMARK OFFICE
CERTIFICATE OF CORRECTION

PATENT NO. : 10,533,354 B2
APPLICATION NO. : 15/299379
DATED : January 14, 2020
INVENTOR(S) : Braskel E. Phillips Page 1 of 1

It is certified that error appears in the above-identified patent and that said Letters Patent is hereby corrected as shown below:

In the Claims

Column 4, Line 37, Claim 1     delete "interior" and insert -- exterior --

Column 4, Line 66, Claim 8     delete "the" and insert -- an --

Signed and Sealed this
Second Day of February, 2021

Drew Hirshfeld
*Performing the Functions and Duties of the
Under Secretary of Commerce for Intellectual Property and
Director of the United States Patent and Trademark Office*